United States Patent [19]

Gilbertson

[11] Patent Number: 4,480,428
[45] Date of Patent: Nov. 6, 1984

[54] SHAFT COUPLER

[76] Inventor: Gordon E. Gilbertson, P.O. Box 21, Morpeth, Ontario, Canada

[21] Appl. No.: 528,643

[22] Filed: Sep. 1, 1983

[51] Int. Cl.³ .......................... B68B 5/08; B62C 5/00
[52] U.S. Cl. ............................................. 54/69; 54/2; 278/118
[58] Field of Search ................... 54/2, 50, 69; 278/29, 278/45, 60, 118

[56] References Cited

U.S. PATENT DOCUMENTS

| | | | |
|---|---|---|---|
| 306,750 | 10/1884 | Hill | 278/118 |
| 385,490 | 7/1888 | Walker | 54/69 |
| 451,381 | 4/1891 | Hutchinson | 54/69 |
| 455,203 | 6/1891 | Hardy | 54/69 X |
| 483,059 | 9/1892 | Hays | 54/69 |
| 3,144,741 | 8/1964 | Andersson | 54/2 X |

Primary Examiner—Robert P. Swiatek
Attorney, Agent, or Firm—Chas. Krassov

[57] ABSTRACT

This invention consists of a coupling device by means of which the shafts of a sulky used in harness horse racing can be quickly and easily attached to or detached from the harness of the horse. It consists primarily of a metal framework, which is part of the harness, into which is inserted the end of each shaft wherein it is held by a spring loaded pin which passes through the framework and the free end of the shaft. The shaft is released simply by pulling the pin out of the shaft end; when released, the pin returns to the locking position until it is pulled up again to reinsert the shaft.

2 Claims, 3 Drawing Figures

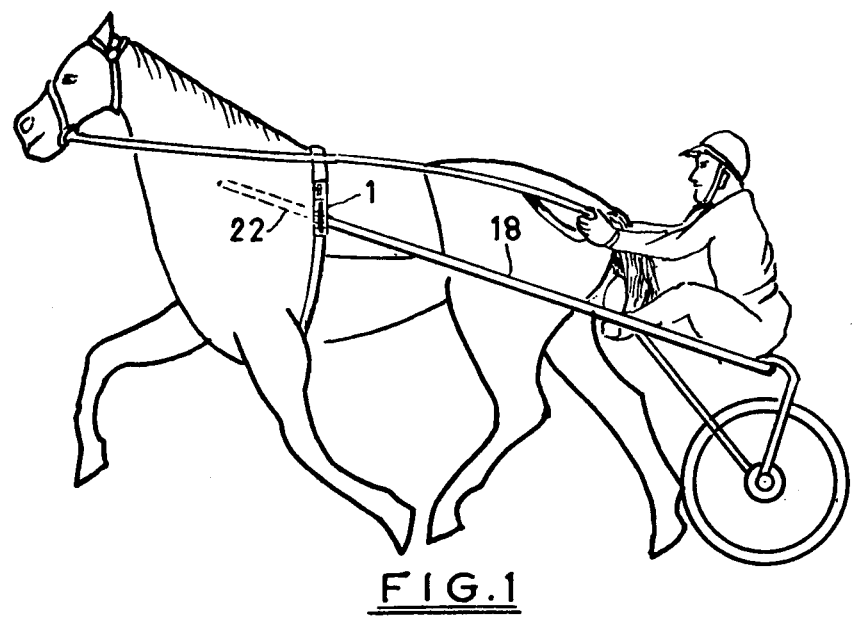
FIG.1
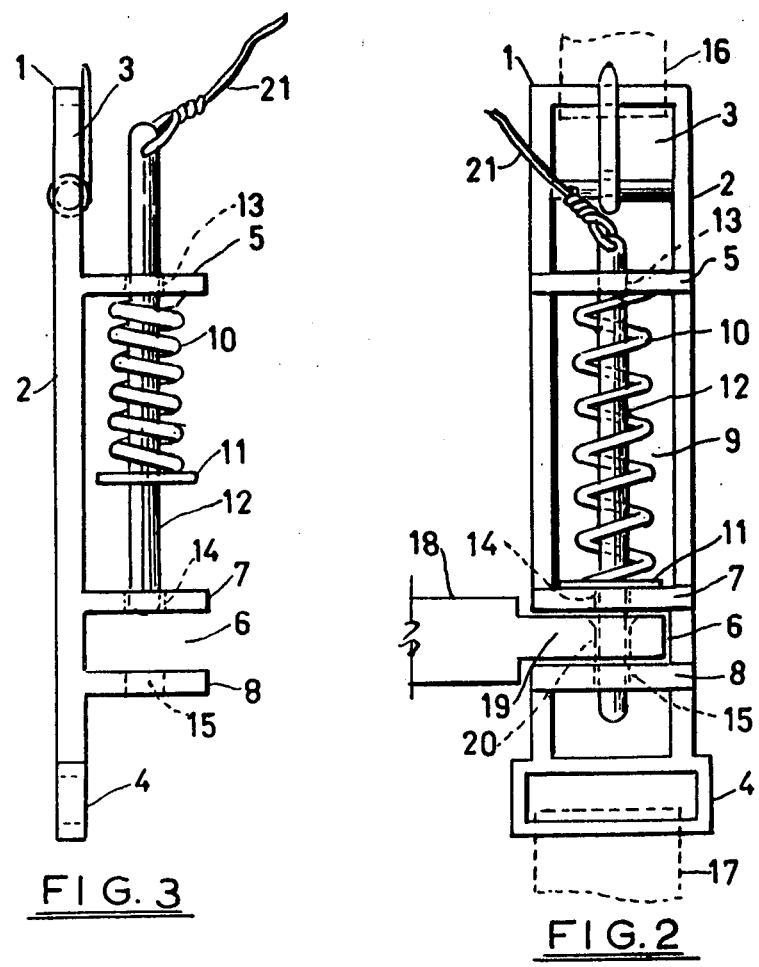
FIG.3
FIG.2

SHAFT COUPLER

This invention relates generally to means for attaching the shafts of a horse drawn vehicle to the harness of the horse, and particularly to a quick coupling and release device for use in connection with the shafts of a sulky used in harness horse racing.

The method used for coupling the shafts of a harness racing sulky to the harness of the horse, prior to this invention, consisted of suspending the shafts a short distance behind their free ends from the backband of the harness by two straps attached laterally, and buckled to specialized loops which encircle the shafts. Fixation of the shaft to the harness is then accomplished by a "safety strap" which encircles one shaft fore and aft of the loop, and buckles back on itself then follows the girth to the opposite shaft, where similar wrapping and buckling is repeated, while applying tension.

This method has many disadvantages, which may be listed as follows:

(a) The free end of each shaft extends a substantial length beyond its fixation point to the harness, making the shafts unnecessarily longer, at times creating difficulties to the itinerant nature of horse racing.

(b) Furthermore, this extra entension creates a lethal hazard during collisions.

(c) During training and warm-up periods, the sulky is hitched an unhitched frequently. It is obvious, from the above description that this procedure consumes a great deal of valuable time and labor.

(d) During an accident, where the horse is in a recumbent position, it becomes very important to release the animal as quickly as possible, so that its life can be saved, or from becoming seriously impaired.

(e) The above mentioned shaft extensions also signficantly interfere with the freedom of movement.

It is, therefore, the primary object of this invention to eliminate the above hazards and disadvantages.

This is accomplished by this invention by providing a quick shaft hitch-up and release mechanism which also eliminates the need for a shaft extension, beyond the fixation point to the harness.

In describing the invention, reference will be made to the attached drawings in which:

FIG. 1 is a general view showing the location of the invention;

FIG. 2 is an elevation of the invention, and

FIG. 3 is a side view of FIG. 2.

In describing the drawings, the coupling 1 is shown consisting of an elongated rectangular main frame 2 having a buckle section at the upper end thereof, and a rectangular-shaped loop 4 at its bottom end. A rectangular plate 5 extends at right angles from the main frame 2 below the buckle part 3. Slightly above the bottom loop 4 is a clevis 6 formed by two spaced rectangular plates 7 and 8 which are identical to plate 5, and extend at right angles from the main frame 2. The remaining space 9 in the main frame 2 contains a spring 10 which is in compression between the underside of the plate extension 5 at its top, and a washer 11 which is attached to a latch pin 12, which is contained within the spring 10.

The pin 12 passes through a hole 13 in the plate 5, a hole 14 in plate 7, and a hole 15 in plate 8. The holes 13, 14, and 15, are properly lined up to allow the free passage of the pin 12, which under normal conditions is long enough to extend part way above the plate 5, and part way below the clevis plate 8.

The coupling device 1 is attached in the proper location on each side of the horse by means of the harness backband 16 and a connecting strap 17.

Each of the shafts 18, terminates at its free end into a centrally located, narrowed down end 19 which fits freely into the clevis 6. A hole 20 is provided in this narrowed down end 19 through which passes the pin 12 when the shaft 18 is fixed to the harness. For clarity purposes, the elaborate harness, which is not essential to the description of the invention, is eliminated from the drawings.

The attachment of the shaft to the harness is very simple and rapid, and consists of pulling the pin 12 out of the clevis 6, by means of a rope or cable 21, against the action of the spring 10; inserting the shaft end 19 into the clevis 6, and allowing the spring 10 to push the pin 12 to pass through the holes 14, 20, and 15.

The harmful shaft extension 22, which is shown in broken line in FIG. 1 is eliminated.

I claim:

1. A device for rapidly attaching and releasing the shafts of a horse-drawn vehicle, to and from the harness of the horse, primarily in connection with harness horse racing, comprising a spring loaded device having an elongated rectangular main frame; the upper part of said frame consisting of a buckle arrangement by means of which the said device is attached to a backband of the harness; the lower part of the device being provided with a loop for attachment of a harness connecting strap; a small rectangular plate just below the buckle arrangement and extending from the main frame and at right angles to it, having a hole in it for the passage therethrough of a latch pin; a clevis formed by two spaced, small, parallel plates extending at right angles from the main frame, and located just above the said bottom loop, for inserting the free end of a sulky shaft therein, with the free end not extending beyond the clevis and being reduced in size relative to the remainder of the shaft; a hole in each of the clevis plates for the passage therethrough of said latch pin; said latch pin comprising a metal spring-loaded rod which passes through said latch pin holes in the top extension plate and the clevis plates; a spring surrounding the latch pin, in compression, between the upper extension plate and a washer which is permanently attached to the latch pin, said pin being long enough to extend above the upper plate extension, and below said clevis in its locked position; and a rope or cable attached to the upper end of said pin by means of which the pin can be pulled upwardly to release the shaft held in said clevis; said shaft having a hole in its free end for the passage of said latch pin therethrough.

2. A device, such as described in claim 1, which is made of metal, plastic, or any other material capable of withstanding tension and wear.

* * * * *